UNITED STATES PATENT OFFICE.

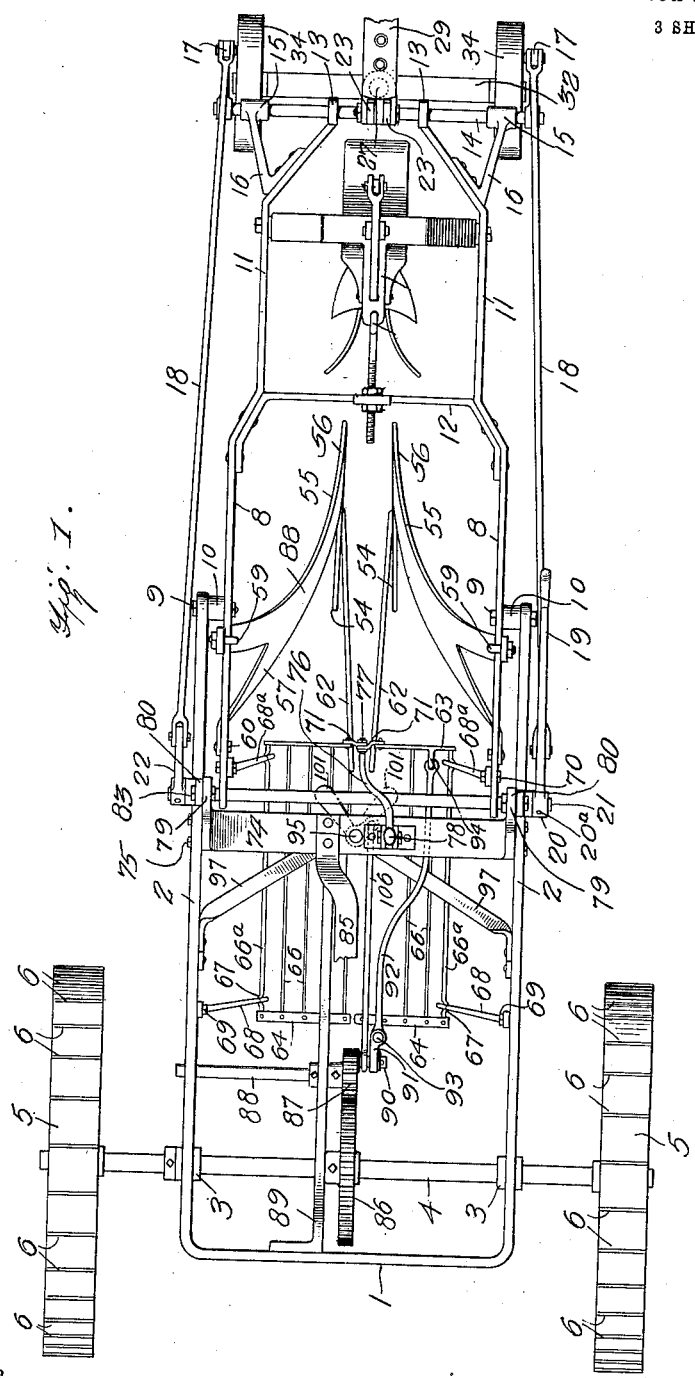

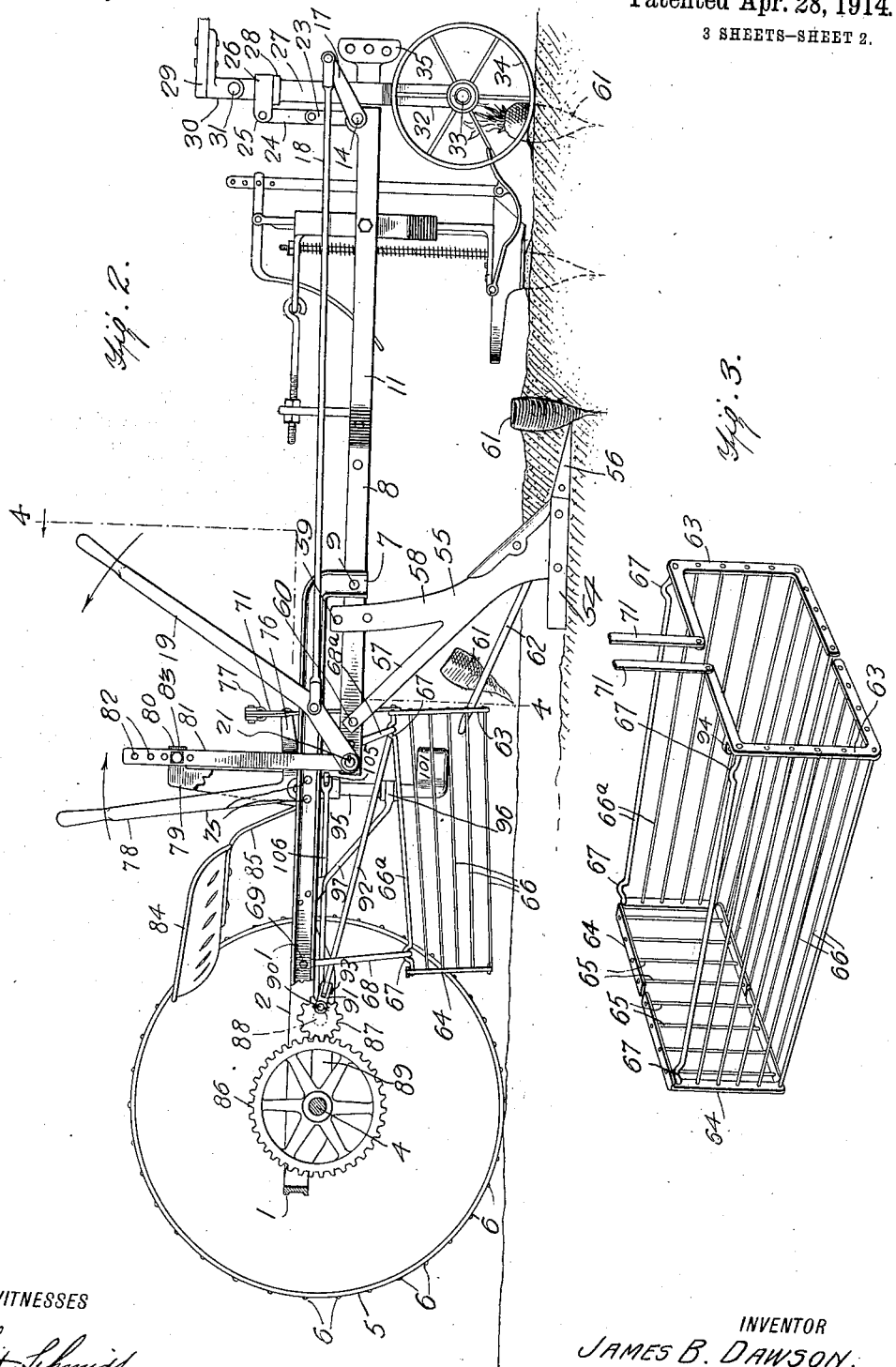

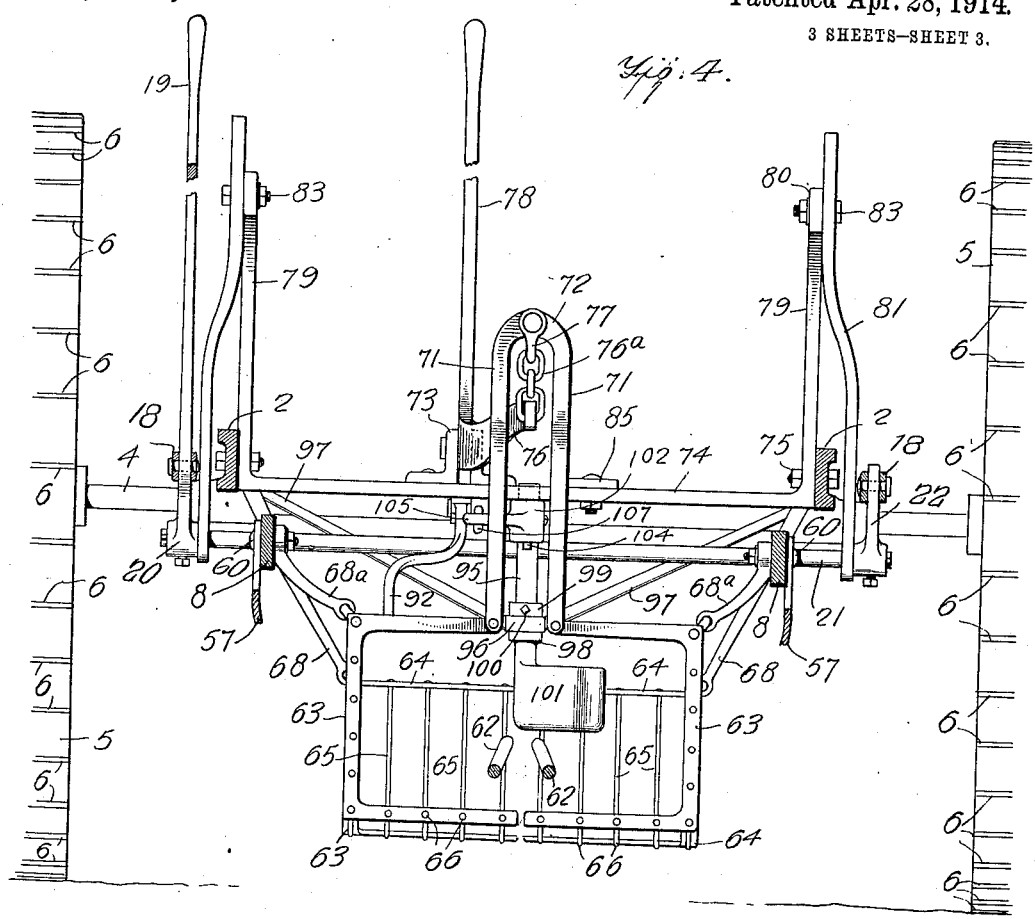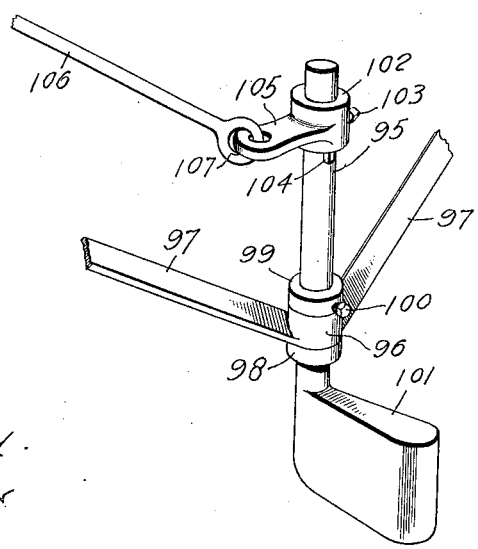

JAMES B. DAWSON, OF POMPEYS PILLAR, MONTANA.

BEET-HARVESTER.

1,094,983.  Specification of Letters Patent.  Patented Apr. 28, 1914.

Application filed March 24, 1913. Serial No. 756,403.

*To all whom it may concern:*

Be it known that I, JAMES B. DAWSON, a citizen of the United States, and a resident of Pompeys Pillar, in the county of Yellowstone and State of Montana, have invented a new and useful Improvement in Beet-Harvesters, of which the following is a specification.

My invention is an improvment in beet harvesters and has for its object to provide a harvesting mechanism especially adapted for use in connection with the crowning mechanisms shown in my co-pending applications, Serial No. 693,642, filed April 27, 1912, and Serial No. 747,878, filed February 12, 1913, but also adapted for use in connection with any form of crowning mechanism wherein means are provided for lifting the crowned beets from the soil without injury to the beets, and for separating the beets from the soil and delivering them into a container, capable of being opened to dump the beets in piles.

In the drawings: Figure 1 is a top plan view of the improved harvester, Fig. 2 is a side view partly in section, Fig. 3 is a perspective view of the holder or receptacle for the beets, Fig. 4 is a section on the line 4—4 of Fig. 2, and Fig. 5 is a detail perspective vew of the beater.

The present embodiment of the invention comprises a substantially U-shaped main frame, consisting of a body 1 and approximately parallel arms 2, each of the said arms having a bearing 3 near its connection with the body, and an axle 4 is journaled in the bearings. Wheels 5 are secured to the ends of the axle, each wheel having transverse lugs 6 to prevent slipping of the wheel. The front end of each of the arms 2 is provided with a depending angular portion 7, and the said body 1 and arms 2 of the main frame, as also the portions 7, are of channel material as shown more particularly in Figs. 2 and 4. A bar 8 is pivoted to each of the portions 7 by means of a bolt 9, and a spacing sleeve or arbor 10 is arranged on the bolt between each bar and the adjacent arms. Each of the bars 8 is offset inwardly at its front end as shown at 11, and the bars are connected at the junction of the inwardly offset portion with the main portion by means of a cross bar 12. The front end of each bar 8 is again offset inwardly and provided with a bearing 13 for receiving a rock shaft 14, the said shaft 14 being journaled in the bearings 13 and in other bearings 15 on arms 16, connected to the front ends of the said bars and extending forwardly and outwardly from the said connection.

An arm 17 is secured to each end of the rock shaft 14. A link 18 is connected with each arm 17, and one of the said links is connected with a lever 19, having a bearing 20 engaging a shaft 21 arranged transversely of the frame and journaled in the rear ends of the arms 8. The other link 18 is connected with an arm 22 on the opposite end of the shaft 21 from the lever 19, and it will be evident that when the shaft 21 is rocked or oscillated by means of the lever 19, the rock shaft 14 will be also rocked for a purpose to be presently described.

The rock shaft 14 is provided near its center with a pair of upwardly extending arms 23, and a link 24 has one of its ends pivoted between the upper ends of the arms. The upper end of the link is pivoted to lugs 25 on a collar 26 which encircles a post or standard 27, the collar resting normally on an annular rib 28 on the post or standard. A tongue 29 is connected to the upper end of the post or standard by means of lugs 30, arranged on opposite sides of the post or standard and pivoted thereto by a bolt 31.

The post or standard is provided at its lower end with oppositely extending inclined arms 32, each having a bearing at its lower end for receiving a shaft 33 and wheels 34 are journaled on the ends of the shaft. The auxiliary frame consisting of the bars 8 and connected parts is mounted to swing on the bolts 9, with respect to the main frame, and the said auxiliary frame is swung by means of the lever 19. When the lever is moved in the direction of the rear of Fig. 2, the rock shaft 14 will be oscillated to swing the arms 23 rearwardly, thus lifting the front end of the auxiliary frame. A clevis 35 is connected with the post or standard near the junction of the arms 32 therewith.

The crowning mechanism indicated generally by the reference character 36, is that shown and described in my above-mentioned co-pending application, Serial No. 747,878, and since it forms no part of the present invention it is no further described.

The lifting mechanism for the beets comprises a pair of plows or digging devices, each comprising a land-side 54, and a share 55, the said share extending upwardly, rearwardly and outwardly from the land-side. A point 56 is connected with the front end of the land-side and the upper end of the share is branched to form branches 57 and 58 and the said branches of each plow are secured to the adjacent bar 8. The branch 58 is secured to the bar by means of a clip 59, and the branch 57 is secured to the bar by means of a bolt 60. The plows are so arranged that the land-sides thereof are approximately parallel and arranged in spaced relation on each side of the crowning blade 44 and in rear of the same.

The plows are so spaced that they will permit the beets indicated at 61 to pass between the plows without injury to the beets. A finger 62 extends rearwardly, upwardly and inwardly from each land-side, each finger being connected to the land-side near the front end thereof and the rear ends of the fingers extend into the receptacle or holder for the beets, to be presently described, so that the beets as they are dug will ride up on and between the fingers into the receptacle or holder. The receptacle or holder shown more particularly in Fig. 3 consists of two sections, each section consisting of substantially U-shaped end frames 63 and 64, the said frames being arranged with their bodies outward and their respective arms in approximate alinement.

The arms of the rear frame 64 are connected by cross rods 65, while the front frames 63 are left open. The adjacent frames 63 and 64 are connected by longitudinally extending rods 66, and the uppermost rods 66ª of each section are provided with upwardly offset portions 67 near each end. The rear offset portions of each frame are engaged by hooks on the lower end of hangers 68, and the upper end of each of the said hangers 68 is pivoted to the adjacent arm 2 of the main frame by a bolt 69 or the like. Other hangers 68ª are connected with the offset portions 67 at the front of the rods 66ª, and each of the said hangers 68ª is pivoted to the rear end of the adjacent bar 8 by means of a bolt 70 or the like. One of the arms 71 of a substantially U-shaped bracket consisting of the said arms and a body 72 is connected with the inner end of each of the upper arms of the end frames 63, and the said bracket extends upwardly above the level of the main frame as shown more particularly in Fig. 4.

An elbow lever is pivoted between a pair of angle plates 73 on the body 74 of a U shaped bracket arranged between the arms 2 of the main frame, transversely of the said frame and secured to the said arms 2 by means of bolts 75. One of the arms 76 of the elbow lever is connected to the body portion of the bracket 71—72 by means of a chain 76ª, having one end connected with the arm 76 and the other end with a clevis 77 pivoted to the body 72 of the said bracket. The other arm 78 of the elbow lever extends upwardly into position to be grasped by the operator, to swing the said elbow lever to raise or lower the front end of the receptacle.

The arms 79 of the U shaped bracket consisting of the body 74 and the said arms 79 extend upwardly from the main frame, and the upper end of each of the said arms is provided with a forwardly extending angular lug 80. A link 81 is arranged adjacent to each of the said arms and each of the links is provided at its upper end with a longitudinally extending series of openings 82. A bolt 83 is passed through one of the said openings, and a registering opening in the angular portion 80 of the adjacent arm 79 to connect the said arm and the link together. The lower end of each of the links 81 is journaled on the adjacent end of the shaft 21, before mentioned. A seat 84 is connected with the body 74 of the U shaped bracket 74—79 by means of a spring plate 85, the said seat being in such position that the operator may easily grasp the lever 78 or the lever 19 to operate the said levers to adjust the auxiliary frame or to raise or lower the forward end of the receptacle for the beets.

A gear wheel 86 is secured to the axle 4 intermediate the ends thereof and the said gear wheel meshes with a pinion 87 on a counter-shaft 88, journaled in one of the arms 2 of the main frame and in a brace 89 connected with the body 1 of the main frame near its center and extending forwardly to a connection with the body 74 of the U shaped bracket 74—79. The pinion 87 is at the inner end of the shaft 88, and that face of the pinion remote from the counter-shaft is provided with an eccentric wrist pin 90.

An arm 91 is journaled on the wrist pin, and a link 92 has one of its ends received between a pair of bearings lugs 93 at the free end of the arm. The front end of the link 92 is pivoted to a lug 94 on the upper arm of one of the end frames 63 of the receptacle. It will be evident that when the shaft 88 is rotated, the link 92 will be reciprocated to impart a vibratory movement to the holder or receptacle to separate the soil from the beets in the holder by agitation.

Mechanism is provided for striking the beets as they enter the receptacle to assist removing the dirt from the beets. The said mechanism is shown more particularly in Fig. 5 and comprises a shaft 95 journaled in a bearing 96 held at the longitudinal center of the main frame and below the same, by means of brace bars 97. Each of the said bars 97 has its outer end connected to the adjacent arm of the main frame and from this connection the said bars extend downwardly, inwardly and forwardly to the bearing 96. The shaft 95 is provided with an annular rib 98, below the bearing 96 and with a collar 99 above the said bearing, the collar being held in adjusted position by a set screw 100.

The lower end of the shaft 95 is provided with a laterally extending beater blade 101, and a bearing sleeve 102 is arranged on the shaft near the top end thereof, the said sleeve being held in adjusted position by a set screw 103. The bearing sleeve is keyed to the shaft by a key 104, and the said sleeve has a radially extending arm 105, the said arm being perforated at its outer end.

A link 106 is provided at one end with a ring 107 for engaging the opening of the radial arm and the other end of the link is journaled on the wrist pin 90, before mentioned. It will be evident that when the shaft 88 is rotated, the beater shaft 95 will be oscillated to swing the beater blade 101 from side to side, and the said shaft 95 is arranged directly behind and between the rear ends of the guiding fingers 62 of the plows, and in such position that the said blade will engage and strike each beet as it is passed into the receptacle from the said guiding fingers.

In operation, the improved lifting machine is drawn through the field in any desired manner with the wheels 34 astride the row of beets, and in such position that the crowning device will engage the beets and crown the same. The operation of the crowning device is set forth in detail in the above-mentioned co-pending application, Serial No. 747,878, and will not here be more particularly described. The beets in turn pass between the points of the plows, and the said plows cut away and loosen the soil on each side of the beets. As the beet passes rearwardly between the land-sides of the plows, the said beet is finally engaged by the guide fingers 62, the said fingers engaging the beet below the greatest cross section thereof and the beet is gradually lifted by the fingers, as the said beets are moved rearwardly by other beets entering between the fingers. Each beet is finally forced out from between the rear ends of the fingers into the receptacle. Just as the beet leaves the fingers it is struck by the beater blade 101, and is knocked to one or the other side of the receptacle. The said receptacle is continuously agitated, being swung longitudinally of the machine and raised and lowered during the swinging, so that the dirt is shaken out between the bars of the holder or receptacle, leaving clean beets in the said holder or receptacle. When the holder or receptacle is full of beets or when it contains as many beets as it may be desired to deposit in one place the receptacle is opened by swinging the lever 78 forwardly. When the said arm is swung forwardly the arm 76 is moved downwardly, thus depressing the U shaped bracket 71—72, and the upper arms of the front frame 63 are swung downwardly on the hangers 68ª. The lower arms of the said frames are swung outwardly away from each other as are also the lower arms of the frame 64, thus opening the receptacle or holder on the central line of its bottom and dumping the beets in the holder or receptacle in a pile on the ground. The beater and the receptacle coöperate to clean the beets. When the beets are first passed into the receptacle they are engaged by the beater, which loosens the dirt clinging to the beets, and the dirt drops down through the bars of the receptacle. The beet is knocked to one side or the other of the receptacle, and since the rear end of the receptacle is at a lower level than the front end, the continuous reciprocation of the receptacle will tend to force the beets rearwardly, so that they do not offer any obstruction to the entry of new beets. When the rear end of the receptacle becomes filled, the operator dumps the beets, and the operation is repeated. The beater is placed at the front of the receptacle, and at approximately the center thereof, and below the upper edges of the said walls, so that the beets will not be knocked out of the receptacle. Were the receptacle not of perforate material, it would soon become loaded with dirt.

I claim:—

1. In a beet harvester, a cleaning receptacle, said receptacle comprising sectional front and rear frames, the sections of each frame being approximately U-shaped and comprising a body extending vertically and arms extending inwardly, spaced rods connecting the sections of each frame, rods connecting the arms of the rear frames, hangers for suspending the receptacle connected with the upper rods at the sides of the receptacle, means for swinging the receptacle and means engaging the uppermost arms of the sections of the front frame for pressing the said arms downward to separate the lower-most arms.

2. In a beet harvester, a cleaning receptacle comprising a perforate receptacle having an open top and an open front end and being divided into sections at the longitudinal center of the receptacle, means for supporting the said receptacle for swinging movement, means for swinging the said receptacle to agitate the beets, and means for swinging the sections away from each other to dump the beets.

3. In a beet harvester, a cleaning receptacle having perforate sides and a perforate bottom and having an open front, said receptacle being divided longitudinally into lateral sections, means for supporting the receptacle for swinging movement longitudinally, and means for swinging the sections away from each other to dump the beets.

4. In a beet harvester, a cleaning receptacle having an open front end and divided longitudinally into lateral sections, means for supporting the receptacle for swinging movement longitudinally, and means for swinging the sections outwardly and upwardly away from each other to dump the beets.

5. In a beet harvester, a supporting frame, a cleaning receptacle having an open front end and divided longitudinally into lateral sections, a swinging connection between each section and the supporting frame, means on the frame for swinging the sections outwardly and upwardly away from each other to dump the beets, a beater shaft journaled vertically on the frame at the front of the receptacle and provided with a lateral beater blade, and means for oscillating the shaft and swinging the receptacle.

6. In a beet harvester, a supporting frame, a cleaning receptacle having an open front end and divided longitudinally into lateral sections, a swinging connection between each section and the supporting frame, means on the frame for swinging the sections outwardly and upwardly away from each other to dump the beets, means in the receptacle for striking the beets to free them from the soil as they enter the receptacle, and means for swinging the receptacle and for operating the said striking means.

7. In a beet harvester, a supporting frame, a cleaning receptacle having an open front end and divided longitudinally into lateral sections, a swinging connection between each section and the supporting frame, means on the frame for swinging the sections outwardly and upwardly away from each other to dump the beets, and means in the receptacle for striking the beets as they enter the same to free them from the soil.

8. In a beet harvester, a cleaning receptacle for receiving the beets, a shaft journaled at the front of the receptacle in vertical position, said shaft having a lateral blade at its lower end, said blade being in position to engage the beets as they enter the receptacle, and means for oscillating the shaft.

9. A beet harvester, comprising a receptacle for the beets, and means in the said receptacle for striking the beets as they enter the receptacle to free them from the soil, said means comprising a vertical shaft having a lateral blade for engaging the beets, and means for oscillating the shaft to cause the blade to swing in opposite directions.

10. A beet harvester, comprising a receptacle for the beets, and means in the said receptacle for striking the beets as they enter the receptacle to free them from the soil.

JAMES B. DAWSON.

Witnesses:
J. A. BLUMMER,
OSCAR POULSEN.